United States Patent [19]

Shiraishi

[11] 4,133,400
[45] Jan. 9, 1979

[54] SNOWMOBILE

[75] Inventor: Nobuaki Shiraishi, Iwata, Japan

[73] Assignee: Yamaha Hatsudoki Kabushiki Kaisha, Shizuoka, Japan

[21] Appl. No.: 848,097

[22] Filed: Nov. 3, 1977

[30] Foreign Application Priority Data

Nov. 5, 1976 [JP] Japan .................................. 51-133534
Nov. 5, 1976 [JP] Japan .......................... 51-149411[U]

[51] Int. Cl.$^2$ ............................................ B62M 27/02
[52] U.S. Cl. ..................................................... 180/5 R
[58] Field of Search ...................... 180/5 R, 9.54, 9.58; 267/57, 58; 305/27

[56] References Cited

U.S. PATENT DOCUMENTS

| 3,075,600 | 1/1963 | Ordorica | 180/5 R |
|---|---|---|---|
| 3,674,103 | 7/1972 | Kiekhaefer | 180/5 R |
| 3,705,637 | 12/1972 | Harvey | 180/5 R |
| 3,750,775 | 8/1973 | Valentine | 180/5 R |
| 3,773,121 | 11/1973 | Irvine | 180/5 R |

Primary Examiner—Richard A. Bertsch
Attorney, Agent, or Firm—Flynn & Frishauf

[57] ABSTRACT

A snowmobile comprises a vehicle body, a suspension mechanism connected at a lower portion of the vehicle body and a torsion mechanism for preventing the outward inclination of the vehicle body when the snowmobile is turned. The tension mechanism is provided with a U-shaped tension member which consists of a pair of arms and a base. The arms extend lengthwise of the vehicle body and have their free ends connected to the rear portion of the suspension mechanism. The base has its both ends secured to the other ends of the arms and is made of material of high torsional rigidity and rotatably supported by the vehicle body. When the snowmobile is turned quickly, the torsion mechanism acts to substantially equalize the downward flexure of both lateral side portions of the suspension mechanism, thereby to prevent the vehicle body from being excessively inclined outward of its turning under a centrifugal force exerted thereon.

6 Claims, 4 Drawing Figures

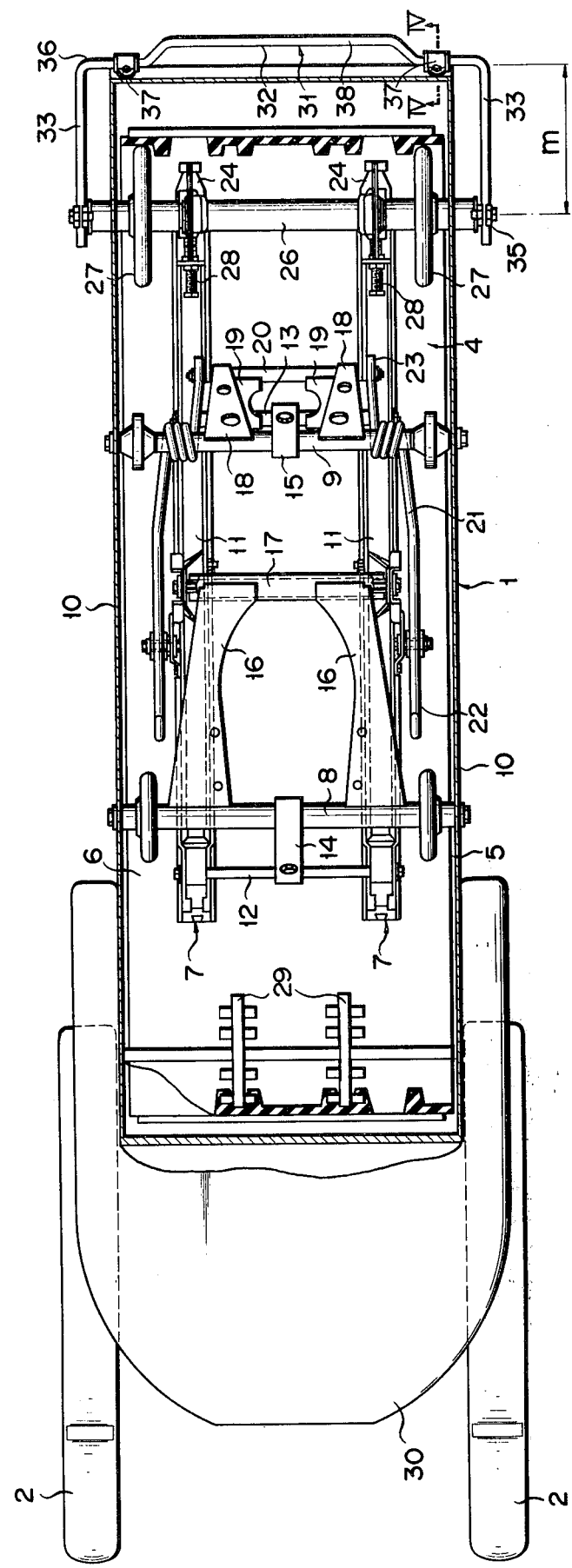

SNOWMOBILE

BACKGROUND OF THE INVENTION

This invention relates to a snowmobile provided with a torsion mechanism which prevents the vehicle body of the snowmobile from inclining excessively under a centrifugal force when the snowmobile is quickly turned.

Generally, a snowmobile comprises a vehicle body, a pair of laterally spaced steering skis attached to the lower front portion of the vehicle body, a suspension mechanism disposed under the vehicle body behind the steering skis, and an endless truck assembly or an endless belt assembly resiliently supporting the vehicle body on snow by means of the suspension mechanism. The width of the truck assembly is smaller than the distance between the laterally spaced steering skis.

While the snowmobile is running at a constant speed, both the skis and the lower portion of the endless truck assembly should be kept in contact with the snow ground. Otherwise, the snowmobile could not run stably. But, if the skis are put in contact with the snow ground when the snowmobile starts to move or is being accelerated, the friction between the skis and the snow ground is so large that a so-called quick start dash or a quick acceleration cannot be provided. For a quick start dash or a quick acceleration, the skis should be lifted off the snow ground. This may be attained if the supported portion of the suspension mechanism on the vehicle body more forwardly than that of a conventional snowmobile such that there increase overhanging areas of the suspension mechanism extending rearwardly from the supported portion, and when the snowmobile starts to move or is being accelerated, the weight of the vehicle body acts concentratedly on the overhanging areas.

However, if the overhanging areas of the suspension mechanism in any of the conventional snowmobiles increase in the above-mentioned manner, one lateral edge of the endless truck assembly which is outward of the center of rotation with respect to the vehicle body is exerted with a greater force than the other lateral edge every time the snowmobile is quickly turned. In this case, that portion of the overhanging areas which corresponds to the lateral edge of the truck exerted by a greater force sinks or downwardly flexes so excessively that the vehicle body inclines considerably toward said one lateral edge under a centrifugal force. Such inclination of the vehicle body obstructs an easy, quick maneuverability of the snowmobile. Thus, the suspension mechanism of the conventional snowmobile could not be provided with larger overhanging areas.

SUMMARY OF THE INVENTION

The object of this invention is to provide a snowmobile wherein the overhanging areas of a suspension mechanism extend longer rearwardly of the vehicle body from the supported portion of the suspension mechanism on the vehicle body than those of the conventional snowmobile to easily lift the skis off the snow ground when the snowmobile starts to move or is being accelerated and wherein a torsion mechanism or a suspension stabilizer is provided at the rear of said supported portion so as to prevent the vehicle body from inclining excessively under a centrifugal force when the snowmobile is quickly turned.

Like a conventional snowmobile, a snowmobile according to this invention comprises a vehicle body, a pair of skis provided under the front portion of the vehicle body, a suspension mechanism supported by the vehicle body rearward of the skis and an endless truck assembly resiliently carried by the suspension mechanism on the vehicle body. The suspension mechanism consists of a pair of laterally spaced suspension units. The supported portion of the suspension mechanism is disposed more forward of the vehicle body than that of the conventional snowmobile so that the length of the over-hanging areas of the suspension mechanism is longer. The snowmobile is provided with a torsion mechanism which comprises a substantially horizontally extending, generally U-shaped torsion member having its base pivoted to the vehicle body and the free ends of its arms connected to rear portions of the corresponding suspension units. The base has such a high torsional rigidity that, when the snowmobile is quickly turned, the suspension unit remote from the center of rotation is prevented from excessively flexing downward.

BRIEF DESCRIPTION OF THE DRAWING

FIG. 2 is a plan view of the snowmobile shown in FIG. 1, showing a suspension mechanism;

DETAILED DESCRIPTION OF THE PREFERRED EMBODIMENT

Figure 1:
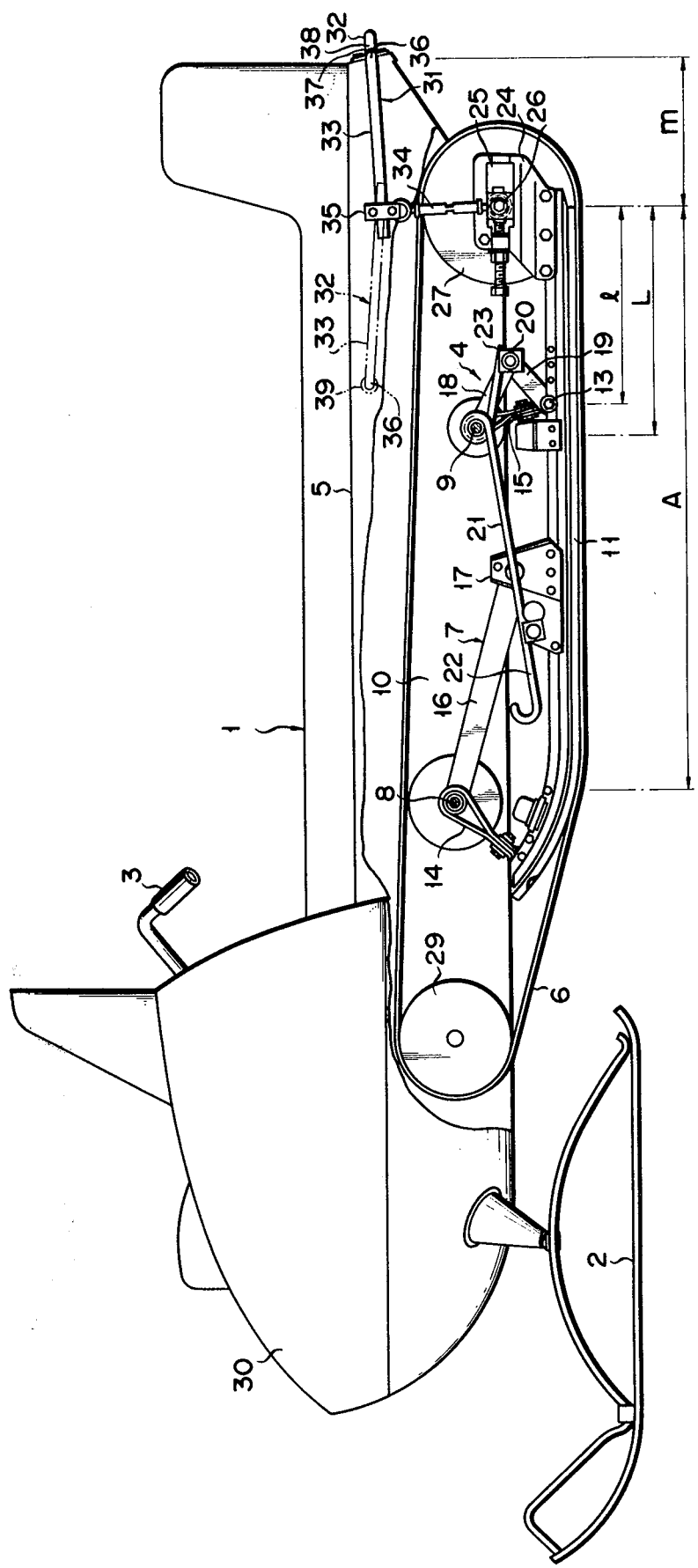
FIG. 1 is a side elevational view of an embodiment of the present invention.

The snowmobile according to this invention is applicable to any type of snowmobile such as of slide rail suspension type and boggy wheel suspension type. For simplicity, hereinafter a snowmobile of slide rail suspension type will be described with reference to FIGS. 1 and 2.

Attached to the front-bottom of a vehicle body 1 are a pair of laterally spaced steering skis 2, which are operated by a steering handle 3. A suspension mechanism 4 is disposed under a channel-like truck housing 5 of the vehicle body 1. The suspension mechanism 4 resiliently supports an endless truck assembly 6 behind the steering skis 2 in a manner as will be described later in detail.

The suspension mechanism 4 comprises a pair of laterally spaced suspension units 7 which are supported by a front traverse shaft 8 and a rear traverse shaft 9. These traverse shafts 8 and 9 are journalled on the respective lateral walls 10 of the truck housing 5. Each suspension unit 7 has a slide rail 11 which extends lengthwise of the vehicle body 1 thereunder. The slide rails 11 of the suspension units 7 are linked to each other by a connecting rod 12 at their front portions and by another connecting rod 13 at their middle-rear portions. The upper and lower ends of the stop member 14 are connected to the middle portion of the front traverse shaft 8 and to the middle portion of the connecting rod 12, respectively. Similarly, the upper and lower ends of the stop member 15 are connected to the middle portion of the rear traverse shaft 9 and to the middle portion of the connecting rod 13, respectively. The slide rails 11 are suspended from the truck housing 5 by stop members 14 and 15.

In each suspension unit 7, an arm member 16 extends rearwardly and downwardly with its front end supported by the front traverse shaft 8 and with its rear end connected to a traverse member 17 which links the suspension units 7 at their substantially middle portions. Each suspension unit 7 is provided with two arms or links 18 and 19. One end of each of the arms 18, 19 is pivoted to a shaft 20. The other end of the arm 18 of each suspension unit 7 is supported by the rear traverse shaft 9, while the other end of the arm 19 is connected to the connecting rod 13. Each suspension unit 7 is further provided with a torsion spring 21 winding at its intermediate portion around the rear traverse shaft 9. The front arm portion 22 of the torsion spring 21 depresses the forward portion of the respective slide rail 11, and the rear arm portion 23 thereof pushes the shaft 20 downward to depress the rear portion of the slide rail 11. As a result, the suspension units 7 are resiliently suspended from the truck housing 5 by means of the torsion spring 21.

A bearing frame 24 is fixed to the rear end portion of each slide rail 11. The bearing frame 24 has a horizontal elongated hole 25. Through the elongated holes 25 of both bearing frames 24 there penetrates a guide wheel shaft 26, on the end portions of which a pair of guide wheels 27 are rotatably mounted. The frames 24 are provided each with a tension bolt 28. By turning each tension bolt 28, the guide wheel shaft 26 can be moved back and forth in the elongated holes 25 so as to have its portion adjusted in the lengthwise direction of the vehicle body 1.

As shown in FIG. 1, a pair of drive wheels 29 is provided in the lower portion of the cowling 30 of the vehicle body 1. These drive wheels 29 are driven by an engine (not shown) in the cowling 30. Between the drive wheels 29 and the guide wheels 27, the endless truck assembly 6 is stretched. The truck assembly 6 is adapted to slide on the lower surfaces of the slide rails 11. That part of the truck assembly 6 which lies on the flat portions of the slide rails 11 forms a snow contacting area A. The tension on the truck assembly 6 is adjusted by turning the tension bolts 28 to move back or forth the guide wheel shaft 26 and guide wheels 27.

Figure 4:
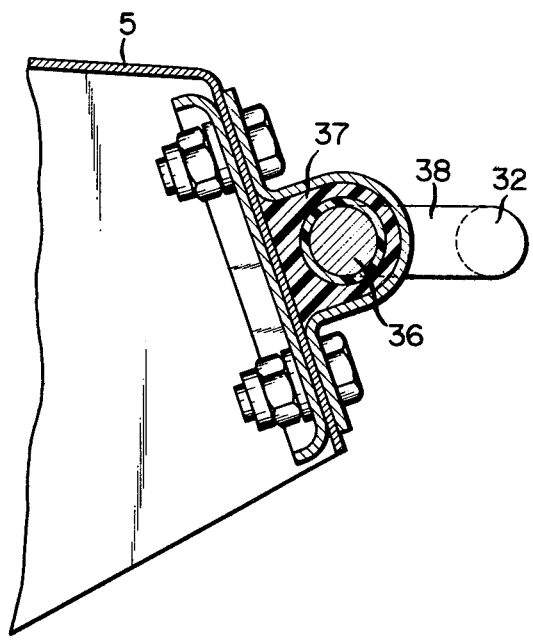
FIG. 4 is a cross section taken along line 4—4 of FIG. 2.
Figure 3:
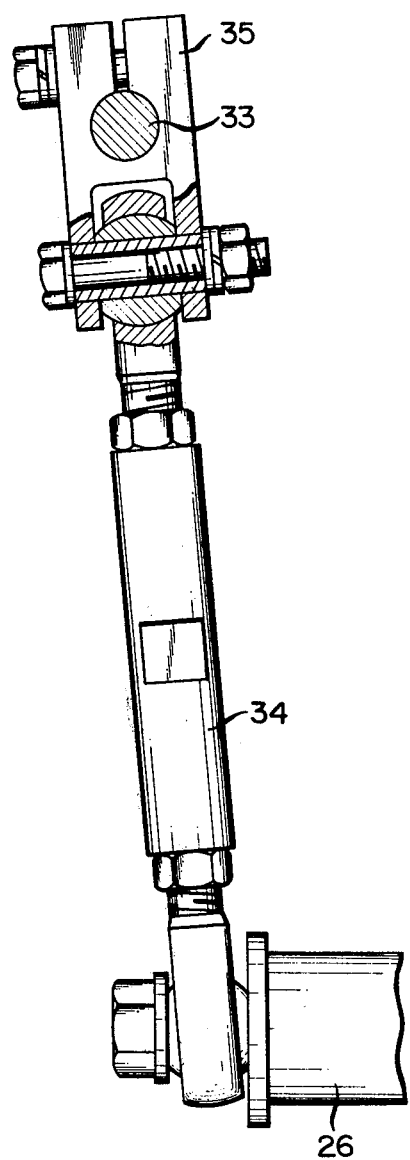
FIG. 3 is a front view of a vertical rod showing the connection to the guide wheel shaft and the torsion member.

The snowmobile is provided with a torsion mechanism 31, which will now be described. A substantially U-shaped horizontal torsion member 32 surrounds the rear end portion of the truck housing 5. The torsion member 32 consists of two lengthwise extending horizontal arms 33 and a base 36 with each end secured to one end of the respective arm 33 and with a high torsional rigidity. The other ends or free ends of the arms 32 are pivoted by joints 35 to the upper ends of corresponding vertical rods 34 (FIGS. 2 and 3). The distance between the joint 35 and the other end of the respective arm 32 is shown by m. The lower ends of the vertical rods 34 are pivoted to the respective ends of the guide wheel shaft 26. Both end portions of the base 36 of the torsion member 32 are rotatably supported on the rear end of the truck housing 5 by means of two supporting members 37 (FIGS. 2 and 4). The middle portion 38 of the base 36 has a shallow U-shape and protrudes rearward from the rear end of the vehicle body 1 so that it may act as a torsion bar and a rear bumper. Further the middle portion 38 may act as a rail with which the snowmobile will be pulled up out of the snow ground.

In case the base 36 is used as only a torsion bar, the horizontal torsion member 32 may be disposed as shown by chain lines in FIG. 1 such that its arms 33 are pivoted to the truck housing 5 at a position 39 in front of the joints 35.

Since the suspension mechanism 4 is constructed as mentioned above, the rear traverse shaft 9 by which the rear half of the mechanism 4 is supported on the vehicle body 1 is positioned much nearer to the middle portion of the suspension mechanism 4 than the rear traverse shaft of the conventional snowmobile. An area l ranging from the connecting rod 13 to the rear end of the snow contacting area A is greater than that of the conventional snowmobile. According to this invention the area l occupies 30 to 40 percent of the snow contacting area A, whereas in the conventional snowmobile the corresponding area occupies, for example, only 14 percent of the snow contacting area. When the snowmobile according to this invention starts running or is being accelerated, the weight of the vehicle body 1 acts chiefly on the overhanging area L. As a result, the suspension mechanism 4 much flexes downward at the overhanging area L with the result that the steering skis 2 are lifted out of the snow ground.

If the snow ground is flat, both lateral edge portions of the endless truck assembly 6 flex downward to the same degree when the snowmobile starts running or is being accelerated or while the snowmobile is running at a constant speed. In this case, the arms 33 of the torsion member 32 are rocked around the mounting members 37 (or position 39) through a substantially same angle. For this reason the torsion mechanism 31 does not affect at all the smooth operation of the suspension mechanism 4.

When the snowmobile is quickly turned while running, the outer lateral edge of the snow contacting area A as viewed from the center of rotation is exerted with a greater upward force than its inner lateral edge, and the outer lateral edge of the overhanging area L would tend to flex downward more than its inner lateral edge due to a centrifugal force exerted on the snowmobile. The upward force on the lateral edge of the overhanging area L is transmitted to the related slide rail 11, bearing frame 24, vertical rod 34 and arm 33 in turn and then tries to twist the base 36 of the torsion member 32. Against this torsional force, the base 36 suppresses the downward flexure of the outer lateral edge of the overhanging area L to the substantially same degree as that of the inner lateral edge. Thus, it can be avoided that the snowmobile would incline excessively so as to be turned over or to put the driver into a danger.

What is claimed is:

1. A snowmobile comprising a vehicle body; a pair of steering skis provided under the front portion of said vehicle body; a suspension mechanism having a pair of slide rails, disposed behind said skis and having its substantially middle portion connected to said vehicle body; a pair of guide wheels rotatably mounted on a guide wheel shaft provided at the rear end of said suspension mechanism; drive wheel means provided at the front portion of said vehicle body; an endless truck assembly stretched between said drive wheel means and guide wheels and extending along lower surfaces of said slide rails; and a torsion mechanism including a U-shaped horizontal torsion member comprising two horizontal arms each having one end connected to the rear end portion of said suspension mechanism and a base having each end secured to the other end of the corresponding arm, said base acting as a torsion bar for substantially equally flexing both the lateral edges of said endless truck assembly when the snowmobile is quickly turned.

2. A snowmobile according to claim 1, wherein said torsion mechanism comprises said torsion member and a pair of vertical rods, one end of each vertical rod being pivotally supported by said guide shaft and the other end thereof by said one end of the corresponding arm of said torsion member.

3. A snowmobile according to claim 2, wherein the base of said torsion member is pivoted to said vehicle body at a position in front of said vertical rods.

4. A snowmobile according to claim 2, wherein the base of said torsion member is pivoted to said vehicle body at a position behind said vertical rods.

5. A snowmobile according to claim 4, wherein said torsion member surrounds the rear portion of said vehicle body, with the base mounted on the rear end of the vehicle body by means of mounting members.

6. A snowmobile according to claim 5, wherein an intermediate portion of the base of said torsion member protrudes rearward from the rear end of said vehicle body and comprises not only a torsion bar but also a rear bumper and a rail for pulling up the snowmobile out of the snow ground.

* * * * *